United States Patent [19]

Inoue et al.

[11] Patent Number: 5,134,194
[45] Date of Patent: Jul. 28, 1992

[54] THERMOPLASTIC RESIN COMPOSITION

[75] Inventors: Takayuki Inoue; Yusuke Arashiro; Shin-ichi Yamauchi; Michiharu Kihira; Haruo Ohmura; Fumiyoshi Yamada, all of Yokkaichi, Japan

[73] Assignee: Mitsubishi Petrochemical Co., Ltd., Tokyo, Japan

[21] Appl. No.: 644,564

[22] Filed: Jan. 23, 1991

[30] Foreign Application Priority Data

Jan. 24, 1990 [JP] Japan .................................. 2-12419
May 25, 1990 [JP] Japan ................................. 2-133736
Jul. 20, 1990 [JP] Japan ................................. 2-190435

[51] Int. Cl.$^5$ .......................................... C08G 63/48
[52] U.S. Cl. ........................................ 525/64; 525/67; 525/68; 525/132; 525/146; 525/175
[58] Field of Search .................. 525/68, 64, 67, 132, 525/146, 175

[56] References Cited

U.S. PATENT DOCUMENTS 4,532,288  7/1985  Robeson ............................ 524/375
4,632,959 12/1986  Nagano ............................... 525/70

Primary Examiner—Melvyn I. Marquis
Attorney, Agent, or Firm—Oblon, Spivak, McClelland, Maier & Neustadt

[57] ABSTRACT

Thermoplastic resin composition comprising the following components A and B is presented which improves the compatibility of component resins, to achieve a thermoplastic resin having excellent molding property and mechanical strength:

A. 90 to 10 wt % of a polyolefin resin containing a substituted silyl group represented by general formula;

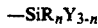

$$-SiR_nY_{3-n}$$

(wherein, R is aliphatic hydrocarbon group; Y is hydrolyzable group or hydroxyl group; n represents 0, 1 or 2), and B. 10 to 90 wt % of saturated polyester resin or hydroxyalkylated polycarbonate resin or hydroxyalkylated polyphenylene ether resin.

10 Claims, No Drawings

THERMOPLASTIC RESIN COMPOSITION

BACKGROUND OF THE INVENTION

1. Industrial Field of Utilization

The present invention relates to a thermoplastic resin composition with superior molding property and mechanical strength.

More specifically, the present invention relates to a thermoplastic resin composition as molding material, wherein a polyolefin resin containing a substituted silyl group is mixed with a saturated polyester resin or hydroxyalkylated polycarbonate resin or hydroxyalkylated polyphenyl ether resin, to provide both the molding property of the former resin and the mechanical strength of the latter resin, and further to prevent therein decreases in impact resistance and the occurrence of delamination, which generally develop easily in incompatible resin mixtures to thereby meet the high-standard quality requirements for structural components of automotive and electrical products.

2. Discussion of the Prior Art

Polyolefin resins are resins for wide use in respective fields, which is generally economical and has superior molding property, low moisture-absorption characteristic, organic solvent resistance and low specific gravity. However, its rigidily at high temperatures is not sufficiently satisfactory in terms of its performance.

On the other hand, various resin have been developed as saturated polyester resin and they are generally excellent in rigidity, heat resistance and the like. However, the molding of these resins may sometimes be difficult, due to their hydrolysis during molding. The resins also have a disadvantage such as the deterioration of electric properties, due to their moisture absorption.

Alternatively, polycarbonate resins show excellent rigidity, impact resistance, heat resistance and the like, but their resistance to organic solvents is poor.

Polyphenylene ether resins are useful as resins for molding materials because of their excellent thermal, mechanical and electrical properties. However, they have problems in molding property, organic solvent resistance, and impact resistance, so their range of utilization is limited.

Hence, if there can be obtained a composition with all of the individual resin properties described above whereby the disadvantages are controlled, its industrial significance can be said, to be extremely important.

However, as polyolefin resins are originally incompatible with saturated polyester resins, polycarbonate resins and polyphenylene ether resins, and in addition, do not have affinity there to the simple mixing of a polyolefin resin there with cannot produce good adhesion in the structural interface of the two components. For that reason, the two-phase interface of the product obtained becomes defective, resulting in the reduction in mechanical strength and impact resistance. Also, it is difficult for the two phases to become unifirm or finely disperse, so delamination easily develops when shearing stress is imposed on the phases during molding such as by injection molding. When these incompatible polymers are to be blended, one of the methods that can be thought of to solve the problems insofar mentioned is to compound a third component in order to improve the affinity of the two components.

As regards to the composition comprising a saturated polyester resin and a polyolefin resin, there have conventionally been proposed methods such as using an ethylene copolymer containing epoxy group as a third component in combination with a saturated polyester resin and a polypropylene resin (Japanese Patent Laid-open No. 60744/1986); using a saturated polyester resin, a polypropylene resin modified with maleic anhydride and an ethylene copolymer containing epoxy group in combination (Japanese Patent Laid-open No. 60746/1986); and using an ethylene copolymer containing epoxy group in combination with a modified polypropylene resin produced by graft copolymerization of an unsaturated epoxy compound and a saturated polyester resin (Japanese Patent Laid-open No. 213352/1989).

Even in such compositions, however, the affinity between the modified polypropylene resin and the saturated polyester resin is not sufficient, so that the combined use of an ethylene copolymer containing epoxy group is essential in order to increase impact resistance. however, as a resullt the rigidity then decrreases and it is difficult to achieve a high level of balance between rigidity and impact resistance.

A great number of inventions have been made regarding mixed compounds of polycarbonate resins and polyolefin resins. The compositions with rigidity enhanced by means of simple mixing of a polycarbonate resin and a polyolefin resin, have been suggested in Japanese Patent Publication No. 13664/1965 and Japanese Patent Laid-open No. 223741/1984. In both, rigidity has been successfully improved to a certain degree. However, the compatibility between the two components is extremely low, so the resulting two-phase interface may have some defects, leading to a decrease in mechanical strength and impact resistance. As it is difficult for the two phases to become uniform or finely dispersed, delamination may readily occur when shearing stress is imposed during molding such as by injection molding, resulting in severe damage to the appearance of the molded product, so that practial use thereof is hard.

Examples for using modified polyolefin resins so as to improve the compatibility between polycarbonate resins and polyolefin resins are illustrated in Japanese Patent Laid-open Nos. 123251/1982 and 125253/1982, both employing ethyleneglycidyl methacrylate copolymers, and Japanese Patent Laid-open No. 223742/1984 employing polypropylene resin modified with unsaturated carboxylic acid. However, the terminals of polycarbonate resins are generally sealed by using terminal stoppers or molecular weight modifiers (for example, monovalent phenols such as p-tertiary butylphenol, phenol and the like), or by using long-chain alkylphenols to modify fluidity, so the effect of a modified polyolefin resin alone on compatibility is not enough.

The present inventors previously found that compositions with excellent properties can be obtained by adding a polycarbonate resin having an aliphatic hydroxyl group at its terminal, together with a polypropylene resin containing carboxyl group or epoxy group to a blend of polycarbonate resin and polypropylene resin, and disclosed the findings in Japanese Patent Laid-open Nos. 215752/1988 and 215749/1988, separately.

In the technique of using a polypropylene resin containing malic anhydride and a polycarbonate resin containing terminal hydroxyl group, as disclosed in Japanese Patent Laid-open No. 215752/1988, further increases in the compounded amount of the polypropylene resin containing maleic anhydride in such a composition so as to further improve the properties thereof can modify the compatibility, resulting in the formation of fine dispersion, but mechanical strength such as impact strength decreases after passing its maximum point.

The production process of polypropylene resin containing glycidyl methacrylate disclosed in Japanese Patent Laid-open No. 215749/1988 is complex, so that there has been a demand for an economical production technique thereof.

In regards to the composition of a polyphenylene ether resin and a polyolefin resin Japanese Patent Publication No. 7069/1967 proposes a blend comprising a polyolefin resin and a polyphenylene ether resin, but the organic solvent resistance and mechanical strength successfully meeting the high level demands required in the industrial field are not necessarily satisfied by this blend. Furthermore, Japanese Patent Laid-open Nos. 71158/1978, 88960/1979 and 100159/1984 propoose to compound, for example, a block copolymer of styrene and butadiene or the hydrogenated products thereof, for the purpose of improving the compatibility of polyphenylene ether resins and polyolefin resins. However, the organic solvent resistance of the polyolefin resin is not sufficiently exerted therein, because of the small amount of polyolefin resin compounded and the substantially continuous phase of polyphenylene ether resin. Japanese Patent Laid-open Nos. 103557/1983 and 76547/1985 each disclose compositions compounded with not less than 20 wt. % of a polyolefin resin, and also compounded with a diblock copolymer comprising for example an alkenyl aromatic compound and conjugated diene, and the hydrogenated product thereof, as compatible agents. Tensile properties and brittleness are improved in the compositions, but the required levels regarding rigidity and thermal resistance cannot be satisfactorily met.

One of the present inventors previously found that a propylene-dialkenylbenzene copolymer modified with styrene monomer is effective as an affinity modifier for polyphenylene ether resins and polypropylene resins, the modified propylenedialkenylbenzene copolymer being obtained by polymerizing, with a styrene monomer in the presence of an initiator of radical polymerization, a crystalline propylene-dialkenyl benzene copolymer obtained by copolymerizing propylene as a main component with a small part of a dialkenylbenzene compound. The inventor disclosed the finding in Japanese Patent Laid-open No. 170647/1989. However, the effects of the addition are not satisfactory in the propylene-dialkenylbenzene copolymer modified with styrene monomer under conditions of radical polymerization; if an amount enough to modify the affinity is added, impact strength is improved, although this involves a problem that rigidity, specifically high-temperature rigidity is lowered, so that further improvement is desired.

The object of the present invention therefore is to provide a resin composition for molding comprising a homogeneous blend of a polyolefin resin with a saturated polyester resin, or a polycarbonate resin, or a polyphenylene resin, in which delamination which is often observed at the molding stage when blending incompatible resins is controlled and in which the final molded products thereof have good appearance and improved mechanical properties, in particular impact strength.

SUMMARY OF THE INVENTION

As a result of intensive investigation in order to solve the above problems, the present inventors have found that the above object can be achieved by a resin composition, comprising compounding a polyolefin resin containing a substituted silyl group with a hydrolyzable groups and the like, a saturated polyester resin, or a polycarbonated resin in which a hydroxyalkyl group is introduced, or a polyphenylene ether resin in which a hydroxyalkyl group is introduced, followed by melting and kneading, to achieve the present invention.

That is, the present invention is a thermoplastic resin composition comprising the components A and B hereinbelow described:

A. 90 to 10 wt. % of a polyolefin resin containing a substituted silyl group represented by the general formula:

(wherein, R is an aliphatic hydrocarbon group, Y is a hydrolyzable group or hydroxyl group, and n represents 0, 1 or 2);

B. 10 to 90 wt. % of a saturated polyester resin or a hydroxyalkylated polycarbonate resin or hydroxyalkylated polyphenylene ether resin.

Although it is not theoretically clear why the substituted silyl group with hydrolyzable groups and the like is effective as the modifying component of component A, the following assumption is coneivable. The condensation reaction of the substituted silyl group itself or with a silanol group is known. Hence, in the present invention, there may be produced polymers of a polyolefin graft polyester type, or polyolefin graft polycarbonate type, or polyolefin graft polyphenylene ether type, from the binding of the substituted silyl group with the hydroxyl group contained in the saturated polyester resin, or the hydroxyalkyl group contained in the hydroxyalkylated polycarbonate resin, or the hydroxyalkyl group contained in the hydroxyalkylated polyphenylene ether resin, as component B, and the polymers produced probably contribute to the affinity of the two resins in each composition.

DETAILED DESCRIPTION OF THE INVENTION

The present invention will now be explained in detail.

Structural Components

1. Component A a. Polyolefin resin containing a substituted silyl group

The polyolefin resin A modified with the silyl group containing hydrolyzable substituting groups, to be used in accordance with the present invention, can be produced, for example, by the following methods.

The compounds are representatively produced by a method where ethylenic unsaturated silane is graft copolymerized, in the presence of a radical generator, with an ethylene series resin comprising polyethylene or a copolymer containing ethylene, as the main component, and the like or a propylene series resin comprising polypropylene or a copolymer containing propylene, as the main component and the like (see for example Japanese Paptent Publication No. 1711/1973 and Japanese Patent Laid-open No. 36115/1984), or by a method comprising high-pressure radical copolymerization of ethylene with ethylenic unsaturated silane or other radical polymerizable monomers in some cases (see Japanese Patent Publication No. 23777/1987).

Silane compounds for modification include silane compounds having a reactive group, graft polymerizable with polyolefin resin, silane compounds having a group reactive with the functional groups introduced into a polyolefin resin, or silane compounds having a reactive group copolymerizable with an olefin monomer, and the like and compounds of the following formula may be generally illustrated:

$R'SiR_nY_{3-n}$

[wherein R' is a group containing a double bond between carbon and carbon, such as vinyl, allyl, isopropenyl, butenyl, cyclohexenyl or γ-(meth)acryloyloxypropyl or the like; R is a hydrocarbon group such as methyl, ethyl, propyl or decyl or the like; Y represents a hydrolyzable group or hydroxyl group; n is 0, 1 or 2; Y includes methoxy, ethoxy, formyloxy, acetoxy propionyloxy or alkylamino or arylamino group or the like.

The compound represented by the general formula:

$CH_2=CHSi(OA)_3$

[wherein A represents an alkyl group with a carbon no. of 1 to 8] is specifically preferable as a modifying silane compound, and includes vinyltrimethoxysilane or vinyltriethoxysilane or the like, in particular.

Polyolefin resins to be modified with the silane compounds containing hydrolyzable groups, hereinabove described, include homopolymers of α-olefins such as ethylene, propylene, butene, hexene, etc., or copolymers of these α-olefins, or copolymers of these α-olefins with the other unsaturated monomers copolymerizable with the α-olefins.

The resin includes, specifically, (very) low-density polyethylene, medium-density polyethylene, high-density polyethylene, polypropylene, propylene-ethylene copolymers, ethylene-vinyl acetate copolymers, ethylene-(meth)acrylic acid copolymers or ion crosslinked products thereof, ethylene- (meth)acrylic acid ester copolymers or mixtures of these polymers, or graft copolymers of the polymers hereinabove mentioned with maleic anhydride, or (meth)acrylic acid or (meth)acrylate.

The production method of the modified polyolefin resin as the component A is not limited to the methods described above. There can be applied a variety of methods such as a method comprising reacting polyolefin resin modified with maleic anhydride with γ-aminopropyl trimethoxysilane. The silane compound for modification is not limited to ethylenic unsaturated silane. Polyolefin resins containing a substituted silyl group to which azidosilane compounds are added through a melting reaction, are also the subject of component A in accordance with the present invention, the azidosilane compound being represented by the general formula:

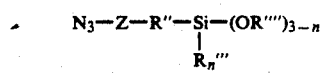

$N_3-Z-R''-Si-(OR'''')_{3-n}$
          |
          $R'''_n$

[wherein Z represents a sulfonyl group or carbonyl group; R'' and R''' represent aliphatic or aromatic hydrocarbon groups of carbon numbers 1 to 20, respectively; R'''' each represents hydrocarbon groups with carbon numbers 1 to 12; and n represents 0, 1 and 2], and including specifically γ-(azidosulfonyl)propyltrimethoxysilane, γ-(azidosulfonyl)-propyltriethoxysilane, etc.

The content of the substituted silyl group in the polyolefin resin containing a substituted silyl group (A) is in the range of 0.1 to 5 wt. %, and it is preferable in the range of 0.1 to 3 wt. %. A content exceeding 5 wt. % is not preferable, because the crosslinking of the silanol condensation reaction which may be possibly facilitated in the kneading process of the compositions may decrease moldability and mechanical strength of the compositions. Further a content of less than 0.1 wt. % has little effect in improving compatibility.

b. Mixed use

In the present invention, the polyolefin resin contining a substituted silyl group can be used alone or in a mixture with an unmodified polyolefin resin. The blending rate of the unmodified polyolefin resin is determined, depending on the content of the substituted silyl group in the polyolefin resin containing a substituted silyl group. In other words, a blending rate, to the mixture, of not less than 0.1 wt. % of the content of the substituted silyl group containing monomer unit may be defined as appropriate.

2. Component B (1) Saturated polyester resin

A variety of polyesters can be used as the saturated polyester resin of the component B to be used in the present invention.

One of the examples includes thermoplastic polyester resins, produced by condensing glycol with dicarboxylic acid or the lower alkyl esters, or acid hallides or anhydric derivatives thereof, according to routine methods.

The aromatic- and aliphatic dicarboxylic acids suitable for the polyester's production are illustrated as follows: namely, oxyalic acid, malonic acid, succinic acid, glutaric acid, azipic acid, suberic acid, azelaic acid, sebasic acid, terephthalic acid, isophthalic acid, p-carboxyphenoacetic acid, p,p'-dicarboxydiphenyl sulfone, p-carboxyphenoxyacetic acid, p-carboxyphenoxypropionic acid, p-carboxyphenoxybutyric acid, p-carboxyphenoxyvalerianic acid, 2, 6-naphthaline dicarboxylic acid, 2, 7-naphthaline dicarboxylic acid, and mixtures of these carboxylic acids.

The aliphatic glycols suitable for the production of the polyester include linear alkylene glycol with 2 to 12 carbon atoms, for example, ethylene glycol, 1,3-propylene glycol, 1,4-butene glycol, 1,6-hexene glycol, and 1,12-dodecamethylene glycol. The aromatic glycol compounds include p-xylylene glycol, pyrocathecol, resorcinol, hydroquinone or the alkyl substituted derivatives of these compounds. 1,4-Cyclohexane dimethanol is also included in other suitable glycols.

Polyesters produced through ring opening polymerization of lactone are among other preferable polyesters. Examples as such are polypivalolactone, poly(ε-caprolactone) and the like.

Other preferable polyesters include those polyesters among polymers capable of forming liquid crystals in a melted state (Thermotropic liquid crystal polymer; TLCP).

As the general structure of liquid crystal resins, semiaromatic polyesters consisting of aliphatic diol and aromatic dicarboxylic acid and aromatic hydroxycarboxylic acid, and all types of polyesters comprising aromatic compounds only, such as a combination of aromatic diol, aromatic dicarboxylic acid and aromatic hydroxycarboxylic acid, or, aromatic hydroxycarboxylic acid alone are wellknown. Aliphatic diol herein includes, for example, ethylene glycol, 1,3-propylene glycol, 1,4-butene glycol, 1,6-hexene glycol, 1,12-dodecamethylene glycol, etc.; aromatic diol includes 1,4-, or 1,3-dihydroxybenzene, 4,4'- or 3,3'-dihydroxydiphenyl, 2,2-bis(4'-hydroxyphenyl)propane, 4,4'-dihydroxydiphenyl ether, 4,4'-dihydroxydiphenyl sulfone, 4,4'-dihydroxydiphenylsulfide, 1,4'-dihydroxynaphthalene, 2,6-dihydroxynaphthalene, and 1,6-dihydroxynaphthalene; aromatic dicarboxylic acid includes terephthalic acid, isophthalic acid, diphenyl-4,4'-dicarboxylic acid, naphthalene-1,4-dicarboxylic acid, naphthalene-2,6-dicarboxylic acid, diphenylsulfone-4,4'-dicarboxylic acid, diphenylether-4,4'-dicarboxylic acid and the like; aromatic hydroxycarboxylic acid includes 4-hydroxybenzoic acid, 4-hydroxydiphenyl-4'-carboxylic acid, 2-hydroxy-6-naphthoic acid, 1-hydroxy-4-naphthoic acid and the like.

The benzene ring and naphthalene ring thereof may be substituted with a lower alkyl group, aryl group and halogen group.

Specific examples of these liquid crystal polyesters include polyesters consisting of ethylene glycol, therephthalic acid and 4-hydroxybenzoic acid; polyesters consisting of 1,4-dihydroxybenzene, terephthalic acid and 4-hydroxybenzoic acid; polyesters consisting of 4,4'-dihydroxydiphenyl, terephthalic acid and 4-hydroxybenzoic acid; polyesters consisting of 4,4'dihydroxydiphenyl, isophthalic acid and 4-hydroxybenzoic acid; and polyesters consisting of 2-hydroxy-6-naphthoic acid and 4-hydroxybenzoic acid, representatively. They are commercially available under product names, such as "X-7G" from Eastman Kokak, Co., Ltd., "Novaculate" from Mitsubishi Chemical Industries, "Rodrun" from Unitia Ltd., "Idemitsu LCP" from Idemitsu Petrochemical Co., "Xydar" from Dartco Co. Ltd. and Nippon Petrochemical Co., "Ekonol" from Sumitomo Chemical Co., "Vectra" from Hoechst Celanese Co., and Polyplastics, Co. Ltd., and "Victrex" from ICI. Japan, K.K., individually.

The liquid crystal resin to be used in the present invention may not be specifically limited, as long as the resin in a melted state exhibits optical isomerism, a so-called liquid crystal state; preferably, the melting point of the resin is in the range of 350° to 100° C. If the melting point exceeds 350° C., the moldability of the resulting compositions is reduced and high-temperature molding becomes necessary leading to the thermal deterioration of the compositions. If the melting point is lower than 100° C., the heat resistance as a composition is not sufficient.

Among the polyesters illustrated as the component B, polyethylene terephthalate (PET), polybutylene terephthalate (PBT), polynaphthalene terephthalate (PEN), poly-1,4-cyclohexane dimethylene terephthalate (PCT), liquid crystal polyesters and the like, are specifically preferable saturated polyester resins to be used as resin compositions of the present invention.

(2) Hydroxyalkylated polycarbonate resin
a. Polycarbonate resins

The polycarbonate resin of the component B to be used in the present invention is a thermoplastic, aromatic polycarbonate polymer, possibly branched, which is produced by reacting an aromatic dihydroxy compound or a small part of a polyhydroxy compound along with the aromatic hydroxy compound, with a phosgene or a diester of cabonic acid. Example of an aromatic dihydroxy compound are 2,2-bis(4-hydroxyphenyl)propane (=bisphenol A), tetramethylbisphenol A, tetrabromobisphenol A, bis(4-hydroxyphenyl)-p-diisopropylbenzene, hydroquinone, methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 1,1-bis(4-hydroxyphenyl)cyclohexane and the like with bisphenol A being specifically preferable. In order to obtain a branched aromatic polycarbonate resin, a polyhydroxy compound illustrated as fluoroglycine, 4,6-dimethyl-2,4,6-tri(4-hydroxyphenyl)-heptene-2, 4,6-dimethyl-2,4,6-tri(4-hydroxyphenyl)heptene, 2,6-dimethyl-2,4,6-tri(4-hydroxyphenyl)heptene-3,4,6-dimethyl-2,4,6-tri(4-hydroxyphenyl)heptane, 1,3,5-tri-(4-hydroxyphenyl)benzene, 1,1,1-tri(4-hydroxyphenyl)ethane and the like, and 3,3-bis(4-hydroxyaryloxyindole[=isathin(bisphenol)], 5-chloroisathin, 5,7-dichloroisathin, 5-bromoisathin and the like, is substituted with some of the dihydroxy compounds described above, such that 0.1 to 2 mol % of the dihydroxy compound is substituted with the polyhydroxy compound. A monovalent aromatic hydroxy compound suitable for modifying molecular weight is preferably illustrated as m- and p-methylphenol, m- and p-propylphenol, p-bromophenol, p-tert-butylphenol and p-long-chain alkyl substituted phenol. Aromatic polycarbonate resin includes, representatively, a bis(4-hydroxyphenyl)alkane compound, specifically the polycarbonate consisting of bisphenol A as its main raw material; besides, a polycarbonate copolymer obtained by using two kinds of aromatic dihydroxy compounds in combination, and a branched polycarbonate obtained by using a small part of trivalent phenol compounds in combination, may also be included. The aromatic polycarbonate resin may be used in the form of a mixture of two or more kinds of the resin.

b. Hydroxyalkylation

The process of producing the polycarbonate resin having an aliphatic hydroxyl group at its terminal, as the component B of the present invention, may be the same as the process for conventional polycarbonate resins, except the use of aromatic compounds containing an aliphatic hydroxyl group and a phenolic OH group, as molecular weight modifier or terminal stopper.

That is, illustrated by the interfacial polymerization method, a divalent phenolic compound and phosgene are reacted, in the presence of an organic solvent unreactive to the reaction as well as an aqueous alkaline solution, followed by addition of molecular weight modifiers and polymerizing catalysts such as tertiary amine or quarternary ammonium salt for polymerization; illustrated by the pyridine method, the divalent phenolic compound and the molecular weight modifier are dissolved in pyridine or a mixed solvent of pyridine and inactive solvent, followed by the purging of phosgene to directly obtain polycarbonate resin. In the interfacial polymerization method, there may be employed the method wherein the molecular weight modifier may be added at the reaction of the divalent phenolic compound and phosgene.

The molecular weight modifier to be used is illustrated as 4-hydroxymethylphenol, 4-hydroxyethylphenol, 2,6-dihydroxymethylphenol and the like, and the amount of the modifier to be used is in the range of 100 to 0.5 mol %, preferably 20 to 2 mol %, to the divalent phenolic compound. Conventionally known molecular weight modifiers can be used along with the aforementioned compounds, according to the present invention.

c. Mixed use

In the present invention, the hydroxyalkylated polycarbonate resin can be used alone or in a mixture with an unmodified polycarbonate resin. The mixed rate of the unmodified polycarbonate resin can be appropriately determined, depending on the mixed ratio of the polyolefin resin modified with silyl group. The mixed ratio of hydroxyalkylated polycarbonate resin and unmodified polycarbonate resin is generally preferable in the range of 100:0 to 10:90 in wt. %. If the rate of the modified resin is less than 10 wt. %, the effect in improving compatibility is lowered, which is not preferable.

(3) Hydroxyalkylated polyphenylene ether resin

The hydroxyalkylated polyphenylene ether resin to be used as the component B in the present invention, is a polyphenylene ether resin produced by adding an alcoholic hydroxyl group to the terminal phenolic hydroxyl groups to render the terminal groups into functioning groups. The polyphenylene ether resin can be produced, for example, by a process which was invented by some of the present inventors and applied for patent; in other words, the resin can be obtained by reacting a polyphenylene ether resin and a reagent for hydroxyalkylation at a temperature of 50° to 200° C., in the presence or absence of an organic solvent solubilizable of the polyphenylene ether resin, by using a basic catalyst.

a. Polyphenylene ether resin

The polyphenylene ether resin to be used in the present invention is a homopolymer or copolymer, having a structure of the general formula:

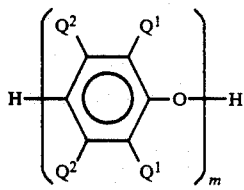

(II)

[wherein $Q^1$ represents a halogen atom, primary or secondary alkyl group, phenyl group, aminoalkyl group, hydrocarbonoxy group or halohydrocarbonoxy group, respectively; $Q^2$ represents a hydrogen atom, halogen atom, primary or secondary alkyl group, phenyl group, haloalkyl group, hydrocarbonoxy group or halohydrocarbonoxy group, respectively; and m represents a number of 10 or more.] The primary alkyl groups of $Q^1$ and $Q^2$ are preferably exemplified in methyl, ethyl, n-propyl, n-butyl, n-amyl, isoamyl, 2-methylbutyl, n-hexyl, 2,3-dimethylbutyl, 2-,3- or 4-methylpentyl or heptyl. The secondary alkyl group is preferably exemplified in isopropyl, sec-butyl or 1-ethylpropyl. In many cases, $Q^1$ is an alkyl group or phenyl group, in particular the alkyl groups with a carbon number of 1 to 4,; and $Q^2$ is a hydrogen atom.

Preferable homopolymers of polyphenylene ether resin comprises for example 2,6-dimethyl-1, 4-phenylene ether unit. Preferable copolymers are the random copolymers consisting of a combination of the unit hereinabove described and 2,3,6-trimethyl-1,4-phenylene ether unit. A great number of the preferable homopolymers or random copolymers are described in patents and references. For example, polyphenylene ether resins containing molecular moieties which can modify the properties such as molecular weight, melting viscosity and/or impact resistnce are also prefarable.

The molecular weight of the polyphenylene ether resin is usually represented by about 0.2 to 0.8 dl/g of its intrinsic viscosity at 30° C. in chloroform.

Polyphenylene ether resin is generally produced through oxidation coupling of the monomer described above. A great number of catalysts are known for the polymerization of polyphenylene ether resin through oxidation coupling. There is no specific limitation in selecting catalysts, and any of the known catalysts may be used, including, for example, those containing at least one of copper, manganese, cobalt and the like in combination with various other substances.

b. Hydroxyalkylation

The hydroxyalkylated polyphenylene ether resin thereby obtained are produced, for example, in the manner of (a) to (f) below:

(a) Process of producing hydroxyalkylated polyphenylene ether resin represented by the general formula:

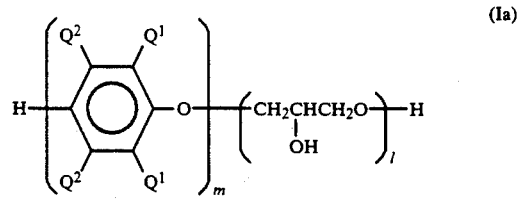

(Ia)

[wherein $Q^1$, $Q^2$ and m are the same as described above; l represents a number from 1 to 10], comprising reacting polyphenylene ether resin (II) with the glycidol represented by the formula:

(IIIa)

(Japanese patent application No. 45653/1990);

(b) Process of producing hydroxyalkylated polyphenyulene ether resin represented by the general formula:

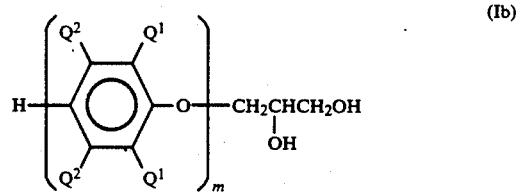

(Ib)

[wherein $Q^1$, $Q^2$ and m are the same as described above), comprising reacting polyphenylene ether resin (II) with a epihalohydrin such as epichlorohydrin, represented by the general formula:

(IIIb)

[wherein X represents a halogen atom], and hydrolyzing the obtained terminal glycidyl modified polyphenylene ether resin (Japanese patent application No. 45653/1990):

(c) Process of producing hydroxyalkylated polyphenylene ether resin represented by the general formula:

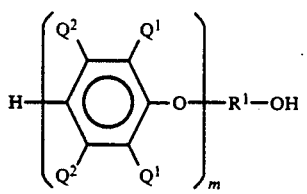
(Ic)

[wherein $Q^1$, $Q^2$, m and $R^1$ are the same as described above and below], comprising reacting polyphenylene ether resin (II) with a halogenated alkylalcohol represented by the general formula:

$$X-R'-OH \qquad \text{(IIIc)}$$

[wherein $R^1$ represents alkylene group with carbon numbers of 1 to 10], including 2-chloroethaneol or 3-chloro-1-propanol and the like (Japanese patent application No. 92998/1990);

(d) Process of producing hydroxyalkylated polyphenylene ether resin represented by the general formula:

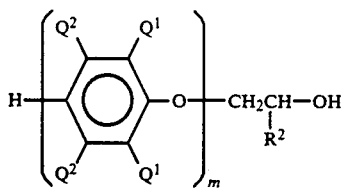
(Id)

[wherein $Q^1$, $Q^2$, m and $R^2$ are the same as described above and below], comprising reacting polyphenylene ether resin (II) with an alkylene carbonate represented by the general formula:

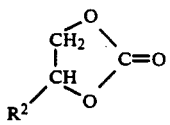
(IIId)

[wherein $R^2$ represents a hydrogen atom or alkyl group with carbon numbers of 1 to 8], such as ethylene carbonate or propylene carbonate and the like (Japanese patent application No. 45655/1990);

(e) Process of producing hydroxyalkylated polyphenylene ether resin represented by the general formula:

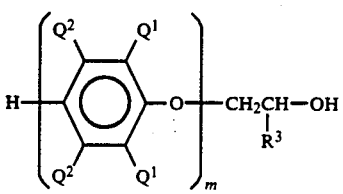
(Ie)

[wherein $Q^1$, $Q^2$, m and $R^3$ are the same as described above and below], comprising reacting polyphenylene ether resin (11) with an alkylene oxide represented by the general formula:

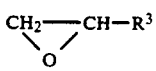
(IIIe)

[wherein $R^3$ represents hydrogen atom or alkyl group of carbon atoms of 1 to 8], such as ethylene oxide or propylene oxide and the like (Japanese Patent Laid-open No. 128021/1988);

(f) Process of producing hydroxyalkylated polyphenylene ether resin represented by the general formula:

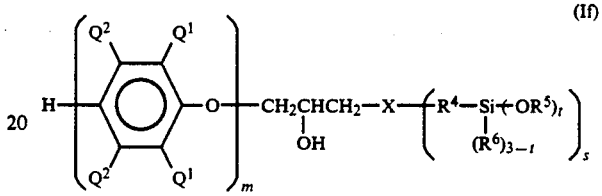
(If)

[wherein $Q^1$, $Q^2$, m, $R^4$, $R^5$, $R^6$, s, t and X are the same as described above and below], comprising reacting polyphenylene ether resin (II) with a compound having an alkoxysilyl group along with a glycidyl group within the same molecule, represented by the general formula

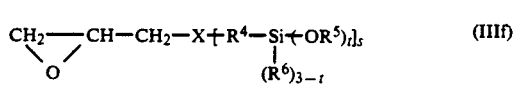
(IIIf)

[wherein X represents an oxygen atom or nitrogen atom; $R^4$ represents an alkylene group with carbon numbers of 1 to 12; $R^5$ and $R^6$ represent hydrocarbon groups with carbon numbers of 1 to 6, individually; s is 1 when X is an oxygen atom, while s is 2 when X is a nitrogen atom; and t is an integer from 1 to 3], such as 3-glycidyloxypropyltrimethoxysilane, N-glycidyl-N, N-bis[3-(methyldimethoxysilyl)propyl]amine and the like (Japanese Paptent Application No. 125388/1990).

The organic solvents to be used herein are aromatic hydrocarbons such as benzene, toluene, xylene, etc.; halogenated hydrocarbons such as chloroform, tetrachlorocarbon, etc.; halogenated aromatic hydrocarbons such as chlorobenzene, dichlorobenzene, etc.; heterocyclic compounds such as N-methyl-2-pyrrolidone, 1,3-dimethyl-2-imidazolidinone, etc.

On the other hand, the nbasic catalysts include alcoholates such as sodium methoxide, sodium ethyxide, etc.; alkali metal hydroxides such as sodium hydroxide, potassium hydroxide, etc.; alkali metal carbonates such as sodium carbonate, potassium carbonate, etc.

The ratio of the reacting amount of polyphenylene ether resin to that of a reagent for hydroxyalkylation alky, to be used in such reaction, is 1 to 50 moles of a reagent for hydroxyalkylation per mol of the terminal phenolic hydroxyl group of the polyphenylene ether resin; the amount of a basic catalyst to be used, is 0.5 to 50 parts by weight of the polyphenylene ether resin.

Among the hydroxyalkylated polyphenylene ether resins (Ia) to (If) to be obtained through the processes (a) to (f), (Ia) or (Ib), containing two or more alcoholic hydroxyl groups with different reactivity and reacting properties, are preferable accorpding to the present invention with (Ia) being particularly preferable.

c. Mixed use

In the present invention, the hydroxyalkylated polyphenylene ether resin can be used alone or in a mixture with unmodified polyphenylene resin. The mixed ratio of unmodified polyphenylene resin can be appropriately determined, depending on the mixed ratio of the polyolefin resin modified with silyl group. The mixed ratio of hydroxyalkylated polyphenylene ether resin and unmodified polyphenylene ether resin is generally preferable in the range of 100:0 to 10:90 in wt. %. If the rate of the modified resin is less than 10 wt. %, the effect for improving compatibility is lowered, which is not preferable.

Additional component

According to the present invention, other additional components may be added to the compositions consisting of the components A and B. For example, there may be added, to the polyolefin resin, additives such as well-known antioxidants, weathering modifiers, nucleating agents, flame retardant additives, slip agents, etc.; to the saturated polyester resin, polycarbonate resin, and polyphenylene ether resin, there may be used, as additional components, additives such as well-known antioxidants, weathering modifiers, thermoplasticizers, fluidity modifiers, mold release agents, nucleating agents, etc.; furthermore, organic- and inorganic fillers, reinforcing agents, particularly glass fiber, mica, talc, wollastonite, potassium titanate, calcium carbonate, silica, etc., are effective for improving rigidity, heat resistance, size precision, size stability, etc. Depending on practical use, various well-known coloring agents and the dispersing agents therefor may be used.

For improving impact strength of the compositions, the addition of impact strength modifiers, specifically styrene-butadiene copolymer rubber or the hydrogenated products thereof, ethylene-propylene-(diene)-copolymer rubber or $\alpha,\beta$-unsaturated carboxylic anhydride modified products thereof, their products modified with $\alpha,\beta$-unsaturated glycidylesters, and unsaturated glycidylethers, copolymer of unsaturated epoxy compounds and ethylene, or copolymer comprising unsaturated epoxy compound, ethylene and ethylenic unsaturated compound are effective. The impact strength modifiers described above may be used signly, or two or more of the modifiers may be used in combination. The compounded amounts of the impact strength modifiers vary depending on the objective physical properties. In case of modifying the balance between rigidity and impact strength concerning a composition, the compounded amount thereof is 5 to 30 parts by weight to 100 parts by weight of the resin component in the composition.

Composition ratio of structural components

The compositions, in accordance with the present invention, comprising the components A and B hereinabove described, can achieve excellent compatibility no matter what value the composition ratio of the components A and B takes. Generally, the composition ratio is in the range of 10 to 90 wt. % of the component A and 90 to 10 wt. % of the component B. Outside this range, the effects of the component added at a small amount are so low that it is difficult to obtain a molding resin composition provided with the characteristic features of the two resins. A composition ratio consisting of 20 to 80 wt. % of the component A and 80 to 20 wt. % of the component B is preferable; with 30 to 70 wt. % of the component A and 70 to 30 wt. % of the component B more preferable.

Process of producing and molding mixed compositions

As the melting and kneading method for obtaining the thermoplastic resin compositions in accordance with the present invention, the method of kneading thermoplastic resins generally used, can be applied. For example, each of components, which is in the form of powder or granule, and, if necessary, the additives described in the section "Additional Component" are homogeneously mixed with by means of a Henschel mixer, ribbon blender, twin-cylinder mixer, etc., and can then be kneaded with a uniaxial or biaxial kneading extruder, roll, Banbury mixer, etc..

The method of molding of the thermoplastic resin compositions of the present invention is not specifically limited, and methods of molding generally used for thermoplastic resins, namely injection molding, blow molding extrusion molding, sheet molding, heat molding, rotary molding, lamination molding, press molding and the like may be applied. Examples The effects of the present invention with now be explained in detail in Examples.

Example of employing saturated polyester resin as Component B

Individual constituents

1. Modified polyolefin resin a. Modified polypropylene resin

By means of a mixer, 0.5 part by weight of benzoyl peroxide, 3 parts by weight of vinyltrimethoxysilane, 0.2 part by weight of an antioxidant tetrakis-[methylene-3-(3.5-di-t-butyl-4-hydroxyphenyl)propionate]methane were mixed with 100 parts by weight of powdery isotatic polypropylene of 0.90 g/cm$^3$ density and 0.2 g/10 min melt flow rate (MFR) at 230° C., which was then melted and mixed at 210° C. with an extruder of an inner diameter of 40 mm and L/D23, to obtain a silane graft modified polypropylene. The MFR of the modified polypropylene was 10.5 g/10min, in which the content of vinyltrimethoxysilane was 2.6 wt. %.

b. Modified polyethylene resin

By melting and mixing the high-density polyethylene of 0.94 g/cm$^3$ density and 1.0 g/10 min MFR at 190° C. in the same manner as described above, silane graft modified polyethylene was obtained.

The MFR of the modified polyethylene was 1.4 g/10 min, in which the content of vinyltrimethoxysilane was 2.5 wt. %.

2. Polyolefin resin

Propylene-ethylene block copolymer (commercial) product name; "Mitsubishi Polypro BC8D", 230° C. MFR 1.2 g/10 min), polypropylene homopolymer (commercial product name; "Mitsubishi Polypro MA3", 230° C. MFR 12 g/10 min), and high-density polyethylene (commercial product name; "Mitsubishi Polyeth HY430", 190° C. MFR 1.0 g/10 min), all manufactured by Mitsubishi Petrochemical Co., were used.

3. Saturated polyester resin

Polybutyrene terephthalate manufactured by Mitsubishi Chem. Ind., (commercial product name "Novadol 5010"), polyethylene terephthalate manufactured by Nippon Unipet K.K., (commercial product name "RT 580CA") and liquid crystal polyester manufactured by Hoechst Celanese Co., (commercial product name "Vectra A950"), were used separately.

Preparation of samples

According to the comounding compositions shown in Tables 1 and 2, a given amount of each of the components was extruded through a twin screw extruder type TEX 30, manufactured by Nippon Seiko K.K., at a temperature 20° C. higher than the melting point of each of the polyesters; which was then watercooled and pelletized. The pellets were dried in a reduced-pressure dryer preset at 120° C. for 12 hours. By using an injection molding machine type M40A-SJ, manufactured by Meiki Seisakusho, injection molding was done at a cylinder temperature 20° C. higher than the melting point of each of the saturated polyester resins and a mold temperature of 60° C., to prepare a sample preparation. The sample was placed in a desiccator immediately after the molding, let stand for 4 to 6 days, and then subjected to evaluation. The results are shown in Tables 1 and 2.

Measurement and evaluation method

1. Flexural modulus

According to ISO R178-1974 (JIS K7203), the values at 23° C. and 80° C. were measured by using an Instron tester.

2. Izod impact

According to ISO R180-1969 (JIS K7110), three sample sheets of a 2 mm thickness were layered and then fixed with cellophane tape. By using an Izod impact tester manufactured by Toyo Seisakusho K.K., Izod impact without notches was measured at 23° C.

3. Water absorption rate

Injection molded samples were left to stand in the atmosphere at a temperature of 23° C. and a humidity of 50% for 20 days, and the weight change was then measured.

4. Delamination

The gate part of the samples injection molded was bent by hand, and the presence or absence of delamination was judged by visually observing the state of their rupture cross-sections. The results of the judgement were shown in the following three grades;

○: no peeling
Δ: partial peeling
X: delamination

TABLE 1

| | | Examples | | | | | | | | | | Comparative Examples | |
|---|---|---|---|---|---|---|---|---|---|---|---|---|---|
| | | 1 | 2 | 3 | 4 | 5 | 6 | 7 | 8 | 9 | 10 | 10 | 11 |
| Compounding ratio (wt %) | | | | | | | | | | | | | |
| Modified polyolefin | Modified polypropylene | 90 | 75 | 50 | 25 | 10 | 50 | 80 | 50 | — | 20 | 100 | — |
| | Modified polyethylene | — | — | — | — | — | — | — | — | 20 | — | — | — |
| Polyolefin | Propylene-ethylene block copolymer | — | — | — | — | — | — | — | — | — | 30 | — | — |
| Saturated polyester | Polybutylene terephthalate | 10 | 25 | 50 | 75 | 90 | — | — | — | 80 | 50 | — | 100 |
| | Polyethylene terephthalate | — | — | — | — | — | 50 | — | — | — | — | — | — |
| | Liquid crystal polyester | — | — | — | — | — | — | 20 | 50 | — | — | — | — |
| Physical properties | | | | | | | | | | | | | |
| Flexural modulus (kg/cm²) | | | | | | | | | | | | | |
| (23° C.) | | 15800 | 16500 | 19000 | 22000 | 22900 | 19300 | 19000 | 29700 | 21600 | 16800 | 12900 | 23000 |
| (80° C.) | | 5300 | 5400 | 5600 | 5500 | 5300 | 3000 | 6600 | 13200 | 3900 | 4300 | 3700 | 3300 |
| Izod impact (23° C.) (w/o notches kg · cm/cm²) | | 62 | 13 | 11 | 25 | 59 | 18 | 65 | 38 | 60 | 42 | 68 | 70 |
| Water absorption (wt %) | | 0.006 | 0.01 | 0.03 | 0.05 | 0.07 | 0.03 | 0.006 | 0.005 | 0.07 | 0.03 | — | 0.093 |
| Delamination | | ○ | ○ | ○ | ○ | ○ | ○ | ○ | ○ | ○ | ○ | — | — |

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| Compounding ratio (wt %) | | | | | | | | | | |
| Polyolefin | Polypropylene | 90 | 75 | 50 | 25 | 10 | 50 | 80 | 50 | — |
| | Polyethylene | — | — | — | — | — | — | — | — | 20 |
| Saturated polyester | Polybutylene terephthalate | 10 | 25 | 50 | 75 | 90 | — | — | — | 80 |
| | Polyethylene terephthalate | — | — | — | — | — | 50 | — | — | — |
| | Liquid crystal polyester | — | — | — | — | — | — | 20 | 50 | — |
| Physical properties | | | | | | | | | | |
| Flexural modulus (kg/cm²) | | | | | | | | | | |
| (23° C.) | | 15500 | 15600 | 18100 | 20500 | 22500 | 18600 | 19900 | 39800 | 20000 |
| (80° C.) | | 4500 | 4300 | 4300 | 4200 | 4200 | 2300 | 8200 | 17300 | 3400 |
| Izod impact (23° C.) (w/o notches kg · cm/cm²) | | 36 | 8 | 6.5 | 15 | 26 | 7 | 16 | 13 | 22 |
| Delamination | | Δ | x | x | x | Δ | x | x | x | x |

Example for employing polycarbonate resin as Component B

Individual Constituents

1. Modified polyolefin resin
   a. Modified polypropylene resin
   Polypropylene containing silyl group manufactured by Mitsubishi Petrochemical Co., (commercial product name "Linkron XPM 800 HM", 230° C. MFR 10g/10 min, vinyltrimethoxysilane content; 2 wt. %) was used.
   b. Modified polyethylene resin
   Polyethylene containing silyl group manufactured by Mitsubishi Petrochemical Co., (commercial product name "Linkron HF700N", 190° C. MFR 0.8g/10 min, vinyltrimethoxysilane content; 1.5 wt. %) was used.

2. Polyolefin resin
   Polypropylene homopolymer (commercial product name; "Mitsubishi Polypro MA8", 230° C. MFR 0.7 g/10 min), propyleneethylene block copolymer (commercial product name; "Mitusibhsi polypro BC8D", 230° C. MFR 1.2g/10 min), and high-density polyethylene (commercial product name' "Mitsubishi Polyeth HY430", 190° C. MFR 1.0 g/10 min), all manufactured by Mitsubishi Petrochemical Co., were used.

3. Modified polycarbonate resin
   Sodium hydroxide (3.4 kg) was dissolved in 42 l of water, and 6.6 kg of 2,2-bis(4-hydroxyphenyl)propane (=BPA) and 8g of hydrosulfite were dissolved into the solution kept at 20° C.
   To the resulting mixture was added 28 l of methylene chloride, and 258 g of 4-hydroxyethyl phenol was added while stirring the mixture followed by purge of 3.3 kg of phosgene for 60 minutes.
   After completion of the phosgene purge, the reaction solution was vigorously agitated to be emulsified. After emulsification, 8 g of triethylamine was added and stirred for about one hour for polymerization.
   After the polymerized solution was separated into an aqueous phase and an organic phase, the organic phase was neutralized with a phosphoric acid, and washed with water repeatedly until the washing solution exhibited neutral pH. Subsequently, 35 l of isopropanol was added to precipitate the polymerized product. The precipitate was filtered and then vacuum dried, to obtain a polycarbonate resin in white powder.
   The viscosity averaged molecular weight of the polycarbonate resin was measured as $2.5 \times 10^4$.

4. Polycarbonate resin
   A resin with the commercial name "Upiron S2000" (viscosity averaged molecular weight $2.5 \times 10^4$) manufactured by Mitsubishi Gas Chemical Co. was used.

Preparation of samples

According to the compounding composition shown in Tables 3 and 4, a given amount of each of the components was melted and kneaded by using a Laboplast mill produced by Toyo Seiki K.K., at a temperature of 260° C. and rotation of 60 rpm, for five minutes. After completion of kneading, samples were ground with a grinder into granules. The granule samples were molded into sheets each of 180 mm (length) × 180 mm (cross) × 2 mm (thickness) by using a compression molding machine produced by Toyo Seiki K.K., from which sample sections were cut and processed for evaluating flexural modulus, Izod impact, tensile strength, appearance and organic solvent resistance.

At kneading and molding, there were used, as the polycarbonate resin and aliphatic hydroxy modified polycarbonate resin, those resins which had been preliminarily dried in a vacuum at 100° C. for 10 to 15 hours. The testing samples for physical evaluation were let stand in the atmosphere at a temperature of 23° C. and a humidity of 50% for 2 to 6 days. The results are shown in Tables 3 and 4.

Measurement and evaluation method

1. Morphology of dispersion
   A part of the molded products were cut, and the morphology of the dispersed phase was observed under a scanning electron microscope Type MSM-9 manufactured by Akashi Seisakusho, at a magnification of 1000 and 5000. By means of an image analysis system Type SPICCA II manufactured by Nippon Avionics K.K., the image picture was observed, to determine volume averaged dispersed particle diameter ($\overline{D}$) by the following formula;
   wherein
   di: diameter corresponding to area equivalent circle
   ni: number of particles belonging to di 2. Flexural modulus
   According to ISO R178-1974 (JIS K7203), the values at 23° C. were measured by using an Instron tester.

3. Izod impact
   According to ISO R180-1969 (JIS K7110), three sample sheets of a 2 mm thickness were layered and then fixed with cellophane tape. By using an Izod impact tester manufactured by Toyo Seiki, K.K., Izod impact without notches was measured at 23° C.

4. Organic solvent resistance
   Bergen's one-fourth ellipse method (SPE Journal, 667, 1962) was followed to measure the resistance. More specifically, a test sample of 2 mm thick was fixed on a one-fourth ellipse device with a 240 mm long axis and 80 mm short axis, and then the sample was immersed in commercially available gasoline for five minutes. The minimum distortion where cracks developed was determined as distortion limit. Then, no occurrence of cracking, a distortion limit of 1.5% or more, a limit of 1.0 to 1.5%, and a limit less than 1.0% were evaluated as extremely fine (⊚), fine (○), ordinary (Δ) and poor (X), respectively.

5. Appearance of molded products
   Appearance of press molded products was evaluated, focusing on delamination. These products practically without problems, those requiring improvement, and those extremely poor were evaluated and represented as ○, Δ, and X, respectively.

TABLE 3

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Compounding ratio (wt %) | | | | | | | | | | | | |
| Modified polyolefin | Modified polypropylene | 14.3 | 10 | 25 | 33.4 | 14.3 | 14.3 | 50 | 25 | — | — | — |
| | Modified polyethylene | — | — | — | — | — | — | — | — | 15 | 25 | 23 |
| Polyolefin | Polypropylene | 21.4 | 40 | 25 | 16.6 | 50 | — | — | 25 | — | — | — |

TABLE 3-continued

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Propylene-ethylene block copolymer | — | — | — | — | — | 35.7 | — | — | — | — | — |
| Polyethylene | — | — | — | — | — | — | — | — | 15 | 25 | — |
| Modified polycarbonate | 14.3 | 10 | 25 | 33.4 | 14.3 | 14.3 | 16.6 | 50 | 35 | 25 | 38.5 |
| Polycarbonate | 50 | 40 | 25 | 16.6 | 21.4 | 35.7 | 33.4 | — | 35 | 25 | 38.5 |
| Physical properties | | | | | | | | | | | |
| Flexural modulus (kg/cm$^2$) (23° C.) | 14700 | 16600 | 14900 | 15500 | 14700 | 11500 | 14800 | 16100 | 13500 | 14200 | 13800 |
| Izod impact (23° C.) (w/o notches kg · cm/cm$^2$) | 20.5 | 10.2 | 20.5 | 13.5 | 14.0 | 19.3 | 18.1 | 25.0 | 26.3 | 28.8 | 29.6 |
| Tensile fracture strength (kg/cm$^2$) | 346 | 302 | 349 | 290 | 346 | 220 | 310 | 384 | 296 | 320 | 300 |
| Organic solvent resistance | ◯ | ◯ | ◯ | ◯ | ◯ | ◯ | ◯ | ◯ | ◯ | ◯ | ◯ |
| Appearance | ◯ | ◯ | ◯ | ◯ | ◯ | ◯ | ◯ | ◯ | ◯ | ◯ | ◯ |
| Dispersed particle diameter (μ) | 5.2 | 10 | 3.5 | 1.5 | 2.1 | 5.2 | 1.8 | 1.5 | 2.6 | 3.4 | 2.0 |

TABLE 4

| | | Comparative Examples | | | | | | | |
|---|---|---|---|---|---|---|---|---|---|
| | | 1 | 2 | 3 | 4 | 5 | 6 | 7 | 8 |
| Compounding ratio (wt %) | | | | | | | | | |
| Modified polyolefin | Modified polypropylene | — | — | — | — | — | 25 | — | — |
| | Modified polyethylene | — | — | — | — | — | — | — | — |
| Maleic anhydride modified polypropylene | | — | — | — | — | — | — | — | 33.4 |
| Polyolefin | Polypropylene | 30 | 50 | 70 | — | — | 25 | 50 | 16.6 |
| | Propylene-ethylene block copolymer | — | — | — | 50 | — | — | — | — |
| | Polyethylene | — | — | — | — | 30 | — | — | — |
| Modified polycarbonate | | — | — | — | — | — | — | 25 | 33.4 |
| Polycarbonate | | 70 | 50 | 30 | 50 | 70 | 50 | 25 | 16.6 |
| Physical properties | | | | | | | | | |
| Flexural modulus (kg/cm$^2$) (23° C.) | | 9200 | 12400 | 13500 | 8600 | 11800 | 13800 | 12400 | 14800 |
| Izod impact (23° C.) (w/o notches kg · cm/cm$^2$) | | 25 | 5.4 | 11.2 | 8.1 | 15.0 | 3.3 | 5.7 | 4.2 |
| Tensile fracture strength (kg/cm$^2$) | | 200 | 160 | 215 | 85 | 182 | 205 | 167 | 232 |
| Organic solvent resistance | | x | x | Δ | x | x | x | x | ◯ |
| Appearance | | x | x | x | x | x | x | x | ◯ |
| Dispersed particle diameter (μ) | | 120 | poor disp. | 100 | poor disp. | 140 | 30 | poor disp. | 2.5 |

Example for employing polyphenylene ether resin as Component B

Individual constituents

1. Modified polypropylene resin

Polypropylene containing silyl group manufactured by Mitsubishi Petrochemical Co., (commercial product name "Linkron, XPM 800 HM", 230° C. MFR 10g/10 min, vinyltrimethoxysilane content; 2 wt. %) was used.

2. Polyolefin resin

Polypropylene manufactured by Mitsubishi Petrochemical Co., (commercial product name "Mitsubishi Polypro MA3", 230° C. MFR 12g/10 min) was used.

3. Modified polyphenylene ether resin a. Modified PPE-1

To 500 g of polyphenylene ether resin of intrinsic viscosity 0.31 dl/g was added 5 l of toluene, which was then stirred in a nitrogen atmosphere at 100° C., to completely dissolve it. To the solution was added 75 g of sodium ethoxide as a catalyst and 500 ml of methanol, to which was added dropwise 250 g of glycidol for 30 minutes. Furthermore, agitation was continued at 100° C. for seven hours. The reaction mixture was poured into 25 l of methanol, to precipitate hydroxyalkylated polyphenylene ether resin as a resulting product. The product was filtered off and washed with methanol two times, which was then heated at 80° C. and dried at reduced pressure.

The hydroxyalkylated polyphenylene ether resin showed the absorption due to the hydroxyl group, of around 3,380 cm$^{-1}$ in the infrared absorption spectrum. The quantitative analysis of the phenolic hydroxyl group at its terminal group was carried out, and it was consequently clearly shown that 90% of its terminal groups reacted.

The reaction rate of the terminal phenolic hydroxyl group of the polyphenylene ether resin was calculated by quantitatively analyzing the terminal phenolic hydroxyl group prior to and after the reaction, according to the method described in The Journal of Applied Polymer Science: Applied Polymer Symposium, Vol. 34, 1978, pp. 103–117.

b. Modified PPE-2

By following the same method as the method for producing modified PPE-1, except the point that the polyphenylene ether resin of the intrinsic viscosity of 0.51 dl/g was employed, hydroxyalkylated polyphenylene ether resin was obtained. The quantitative analysis of the phenolic hydroxyl group in its terminal group showed that its reaction rate was 82%.

c. Modified PPE-3

Four hundred grams (400 g) of polyphenylene ether resin of intrinsic viscosity 0.31 dl/g was dissolved in 4 l of chlorobenzene, immediately followed by addition of 44 g of ethylene carbonate and 4 g of potassium carbonate, which was then stirred at 120° C. for 8 hours.

The reaction solution after cooling was gradually poured into 20 l of methanol, and the resulting hydroxyalkylated polyphenylene ether resin was precipitated. The precipitated polymer was filtered off, which was washed with 20 l of purified water, and immediately washed with 15 l of methanol twice, and then the polymer was heated at 80° C. and dried under reduced pressure.

The hydroxyalkylated polyphenylene ether resin showed absorption of around 3,600 cm$^{-1}$ in the infrared absorption spectrum, probably due to the hydroxyl group. The quantitative analysis of the phenolic hydroxyl group in its terminal group was carried out before and after the reaction, and consequently it was shown that 54% of the terminal groups reacted.

d. Modified PPE-4

To 400 g of polyphenylene ether resin of intrinsic viscosity 0.31 dl/g was added 4 l of toluene, which was then stirred in a nitrogen atmosphere at 95° C., to completely dissolve it. To the solution was subsequently added 800 g of 3-chloropropanol and 30 g of sodium ethoxide, which was continuously heated and agitated for 7 hours. The reaction mixture was poured into a large amount of methanol, and the resulting hydroxyalkylated polyphenylene resin was precipitated. The polymer filtered was washed with water, and twice with methanol, which was then heated at 85° C. and dried under reduced pressure.

The hydroxyalkylated polyphenylene ether resin showed absorption around 3,600 cm$^{-1}$ in the infrared absorption spectrum, probably due to the hydroxyl group. The quantitative analysis of the phenolic hydroxyl group in its terminal group was carried out before and after the reaction, and it was consequently shown that 64% of its terminal groups reacted.

4. Polyphenylene ether resin

Two types of poly(2,6-dimethyl-1,4-phenylene ether) prepared preliminarily by nippon Polyether K.K., with intrinsic viscosities measured in chloroform at 30° C. of 0.31 dl/g and 0.51 dl/g, were used. (In the Tables, they are abbreviated as PPE [$\eta$]=0.31 and PPE [$\eta$]=0.51, respectively.)

Preparation of samples

According to the compounding composition shown in Table 5, a given amount of each of the components was melted and kneaded by using a Laboplast mill produced by Toyo Seiki K.K., at a temperature of 280° C. to prepare a composition, which was then ground with a grinder into powder. By using a hydraulic compression molding machine manufactured by Toyo Seiki K.K., the powdery sample was pressure molded into sheets at 280° C., which were used as samples for evaluating physical properties.

Individual physical properties and various properties were measured and evaluated as follows, and the results are shown in Table 5.

Measurement and evaluation method

1. Morphology of dispersion

A part of the sample sections was cut out and ion etched. Then, the size of dispersed phase was observed under a scanning electron microscope Type S-2400 manufactured by Hitachi.

2. Flexural modulus

According to ISO R178-1974 (JIS K7203), the values at 23° C. were measured by using an Instron tester.

3. Izod impact

According to ISO R180-1969 (JIS K7110), three sample sheets of 2 mm thick were layered, which was then fixed with cellophane tape. By using an Izod impact tester manufactured by Toyo Seiki K.K., Izod impact without notches was measured at 23° C.

4. Organic solvent resistance

Bergen's one-fourth ellipse method (SPE Journal, 667, 1962) was followed to measure the resistance. More specifically, a test sample of 2 mm thick was fixed on a one-fourth ellipse device with a 240 mm long axis and 80 mm short axis, and then the sample was immersed in commercially available gasoline for five minutes. The minimum distortion where crack developed was determined as distortion limit. Then, no occurrence of cracking, a distortion limit of 1.5% or more, a limit of 1.0 to 1.5%, and a limit less than 1.0% were evaluated as extremely fine (⊚), fine (○), ordinary (Δ) and poor (X), respectively.

By using an injection molding machine CS-183 MMX MINI MAX manufactured by Custom Scientific Co., Ltd., test sections each of 6.2 mm (width)×32 mm (length)×3.2 mm (thickness) were injection molded from the powdery sample. The appearance of the test sections was examined, focusing on the presence or absence of delamination.

Then, the sections practically without problems and those with problems were evaluated and represented as ○ (fine) and X (poor), respectively.

TABLE 5

| | Examples | | | | | | | | Comparative Examples | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Compounding ratio (wt %) | | | | | | | | | | | | | | |
| Modified polypropylene | 50 | 50 | 50 | 50 | 30 | 70 | 50 | 25 | — | — | 50 | — | — | — |
| Polypropylene | — | — | — | — | — | — | — | 25 | 50 | 50 | — | 50 | — | 100 |
| Modified | | | | | | | | | | | | | | |
| PPE-1 | 50 | — | — | — | — | — | 25 | 50 | — | — | — | 50 | — | — |
| PPE-2 | — | 50 | — | — | 70 | 30 | — | — | — | — | — | — | — | — |
| PPE-3 | — | — | 50 | — | — | — | — | — | — | — | — | — | — | — |
| PPE-4 | — | — | — | 50 | — | — | — | — | — | — | — | — | — | — |

TABLE 5-continued

| | Examples | | | | | | | | Comparative Examples | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| PPE [η] = 0.31 | — | — | — | — | — | — | 25 | — | 50 | — | 50 | — | 100 | — |
| PPE [η] = 0.51 | — | — | — | — | — | — | — | — | — | 50 | — | — | — | — |
| Physical properties | | | | | | | | | | | | | | |
| Flexural modulus (kg/cm²) (23° C.) | 16.000 | 14.600 | 16.000 | 15.800 | 16.500 | 14.000 | 14.400 | 16.100 | 14.400 | 14.500 | 14.900 | 14.400 | 19.800 | 13.600 |
| Izod impact (23° C.) (w/o notches kg·cm/cm²) | 5.5 | 4.9 | 4.4 | 4.1 | 4.5 | 5.8 | 4.3 | 5.0 | 5.4 | 4.4 | 4.1 | 5.1 | 4.0 | 30.0 |
| Organic solvent resistance | ○ | ○ | ○ | ○ | ○ | ○ | ○ | ○ | x | x | Δ | x | x | ○ |
| Dispersed particle diameter (μm) | 0.5~5 | 0.5~8 | 0.5~5 | 1~10 | 1~5 | 0.5~5 | 1~5 | 1~5 | 100< | 100< | 20~50 | 100< | — | — |
| Appearance of molded products | ○ | ○ | ○ | ○ | ○ | ○ | ○ | ○ | x | x | x | x | — | — |

Effects of the Invention

The resin composition in accordance with the present invention as shown in the Examples in which a specified msdified polyolefin resin is used have the following remarkable effects; the dispersed particle diameter is greatly reduced and, that is, the compatibility of originally incompatible coomponents is improved to prevent delamination; and furthermore, the various properties of the molded products therefrom are remarkably improved, compared with the compositions represented in the Comparative Examples.

Hence, the novel resin composition proposed by the present invention can be easily molded into molded products, film, sheet and the like, according to the molding processes generally used for thermoplastic resin, such as injection molding, extrusion molding, blow molding, etc., to produce products with superior appearance and smoothness, and extremely fine balance among rigidity, heat resistance, impact resistance, chemical resistance, water resistance and the like.

What is claimed is:

1. Thermoplastic resin composition comprising the following components A and B:

A. 90 to 10 wt. % of a polyolefin resin containing a substituted silyl group represented by the general formula.

$-SiR_nY_{3-n}$ (wherein, R is an aliphatic hydrocarbon group; Y is a hydrolyzable group or hydroxyl group; n represents 0, 1 or 2); and B. 10 to 90 wt. % of a hydroxyl group-containing saturated polyester resin or a hydroxyalkylated polycarbonate resin or a hydroxyalkylated polyphenylene ether resin.

2. The thermoplastic resin composition according to claim 1, wherein the polyolefin resin containing a substituted silyl group of component A comprises a copolymer of a polyolefin resin graft copolymerized, in the presence of radical generators, with the silane compound of the following formula:

$R'SiR_nY_{3-n}$

[wherein R' represents a vinyl, allyl, isopropenyl, butenyl, cyclohexenyl or γ-(meth)acryloyloxypropyl group; and R, Y and n are the same as defined in claim 1.

3. The thermoplastic resin composition according to claim 1, wherein the substituted silyl group in component A is $-Si(OCH_3)_3$ or $-Si(OC_2H_5)_3$.

4. The thermoplastic resin composition according to claim 1, wherein the polyolefin resin in component A is polypropylene resin or polyethylene resin.

5. The thermoplastic resin composition according to claim 1, wherein the content of the substituted silyl group in component A is 0.1 to 5 wt. %.

6. The thermoplastic resin composition according to claim 1, wherein the hydroxyl group-containing saturated polyester resin as component B is polyethylene terephthalate, polybutylene terephthalate, polynaphthalene terephthalate, poly-1,4-cyclohexane dimethylene terephthalate or liquid crystal polyester.

7. The thermoplastic resin composition according to claim 1, wherein the hydroxyalkylated polycarbonate resin as component B is one terminated with 4-hydroxymethylphenol or 4-hydoxyethyl phenol.

8. The thermoplastic resin composition according to claim 1, wherein the hydroxyalkylated polyphenylene ether resin as component B is one represented by the following formula;

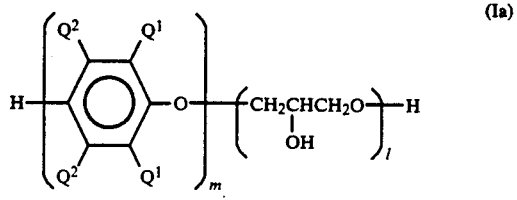

(Ia)

[wherein $Q^1$ represents a halogen atom, a primary or secondary alkyl group, phenyl group, aminoalkyl group, hydrocarbonoxy group or halohydrocarbonoxy group, respectively; $Q^2$ represents a hydrogen atom, halogen atom, a primary or secondary alkyl group, phenyl group, haloalkyl group, hydrocarbonoxy group or halohydrocarbonoxy group, respectively; m represents a number of 10 or more and l represents a number of 1 to 10].

9. The thermoplastic resin composition according to claim 1, wherein the component A is 20 to 80 wt. % and the component B is 80 to 20 wt. %.

10. The thermoplastic resin composition according to claim 1, wherein the component A is 30 to 70 wt. % and the component B is 70 to 30 wt. %.

* * * * *